May 4, 1954     H. DONANDT     2,677,256

COUPLING

Filed Oct. 18, 1950     2 Sheets-Sheet 1

INVENTOR.
Hermann Donandt
BY

Patented May 4, 1954

2,677,256

UNITED STATES PATENT OFFICE 2,677,256

COUPLING

Hermann Donandt, Karlsruhe (Baden), Germany

Application October 18, 1950, Serial No. 190,766

3 Claims. (Cl. 64—23)

The present invention relates to a coupling, and more particularly to a coupling between the rotor of an electric motor and the shaft thereof.

It is an object of the present invention to provide a coupling between a rotating member and a shaft which transfers the torque of the rotating member to the shaft without play.

It is another object of the present invention to provide a coupling between a rotating member and a shaft which permits the rotating member to be displaced under load in the direction of the axis of the shaft.

It is a further object of the present invention to provide a coupling which allows a displacement of the rotor of an electric motor in the direction of the axis of the shaft which is arranged undisplaceably in the longitudinal direction thereof.

The present invention in its broadest aspect consists in a coupling comprising in combination, a rotating member having a boring and a plurality of substantially parallel first grooves arranged in the wall of the boring, a shaft extending through the boring and having a plurality of substantially parallel second grooves arranged, respectively, opposite to the first grooves so as to form a plurality of substantially parallel channels, and a plurality of balls arranged, respectively, in the channels formed by the first and second grooves whereby the rotating member is enabled to carry out displacements in the direction of the channels and is coupled with the shaft so as to transfer to the same a rotation of the rotating member.

In a preferred embodiment of the present invention means such as ball-retaining rings are provided for preventing the balls from leaving the channels formed by the first and second grooves.

Preferably the grooves are parallel to the axis of the shaft.

In a preferred embodiment of the present invention the boring of the rotating member has a circular cross-section and the first grooves are spaced apart by substantially equal distances.

Preferably at least three balls are provided which are equally spaced on a circle drawn about the axis of the shaft so that the balls include between one another an angle of 120° at the center of the circle. However, if desired, any larger number of balls may be provided, and the first and second grooves may be arranged correspondingly.

A preferred embodiment of the present invention comprises in combination: a rotating member, a first part rigidly connected to said rotating member and having a plurality of substantially parallel first grooves, a shaft extending through said first part, a second part rigidly connected to said shaft and having a plurality of substantially parallel second grooves arranged, respectively, opposite to said first grooves so as to form a plurality of substantially parallel channels, and a plurality of balls arranged, respectively, in said channels formed by said first and second grooves, whereby said rotating member is enabled to carry out displacements in the direction of said channels and is coupled with said shaft so as to transfer to the same a rotation of said rotating member.

Preferably the rotating member forms the rotor of an electric motor which rotor is preferably conically shaped and pulled by the stator against the action of resilient means such as a spring into one of its end positions when the stator is energized.

Preferably the conically shaped rotor is rigidly connected to a braking member. In consequence thereof the rotor is pulled in the longitudinal direction of the shaft by the solenoid effect exerted on the rotor by the stator so that the brake is released. However, the shaft is not displaced in the direction of the axis thereof so that the rotor has not to overcome any frictional forces exerted by gears connected to the shaft or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
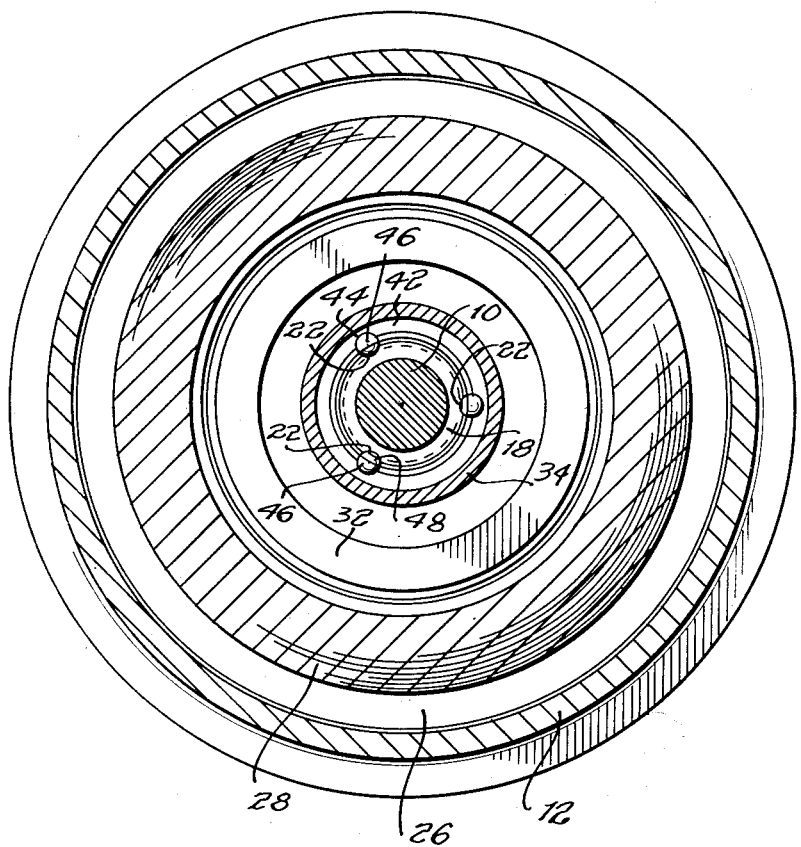
Fig. 2 is a cross-section along the line 2—2 of Fig. 1.

Referring now to the drawings, a shaft 10 is carried by the motor casing 12 in ball bearings 14 and is undisplaceable in the direction of the axis of the shaft 10 with respect to the casing 12. The shaft carries two collars 16 and 18 of which the collar 16 (hereinafter termed the second part) is rigidly connected to the shaft by means of a key 20. The other collar 18 may be designed as an annulus rotatably arranged with respect to the shaft 10. Both collars 16 and 18 are provided with circumferential grooves 22 (hereinafter termed the second grooves) which are substantially parallel to one another and preferably to the axis of the shaft 10. The grooves 22 are preferably spaced apart by equal distances. In the drawing (Fig. 2) three grooves 22 are shown which are arranged on a circular cylinder being coaxial with the shaft 10 and include between one another angles of 120° at the axis of the cylinder.

The shaft 10 is adapted to be driven by a conically shaped rotor 24 of an electric motor having a stator 26 which has a conical shape at the inner side thereof corresponding to the shape of the rotor 24. The stator is excited by a stator winding 28 whereas the rotor 24 is designed as a squirrel cage armature of the motor having end plates 30 and 32.

The rotor 24 is rigidly connected to a sleeve 34 carrying at its lowermost end a braking part 36 cooperating with a second stationary braking part 38 rigidly connected to the motor casing 12. The sleeve 34 comprises two collars 40 and 42 arranged opposite the collars 16 and 18 on the shaft 10. The collar 40 is termed hereinafter the first part. Both the collars 40 and 42 are provided with grooves 44 (hereinafter termed the first grooves) arranged in the wall of the boring of the collars 40 and 42 opposite to the second grooves 22, respectively.

The first grooves 44 and the second grooves 22 have preferably each a semi-circular cross-section so as to form cylindrical channels arranged parallel to the axis of the shaft 10. In each of the channels is arranged a ball 46 which transfers the torque from the rotor 24 to the shaft 10.

Preferably ball-retaining rings 48 are provided which prevent the balls 46 from leaving the cylindrical channels formed by the first grooves 44 and the second grooves 22.

The sleeve 34 is provided with an intermediate collar 50 projecting centrally and having a cylindrical boring near the shaft 10 which is separated from the latter by a small gap 52. A resilient means such as a helical spring 54 is provided between the collar 16 and the collar 50 and tends to urge the rotor 24 into its lowermost end position in which the braking part 36 is in contact with the braking part 38.

Figure 1:
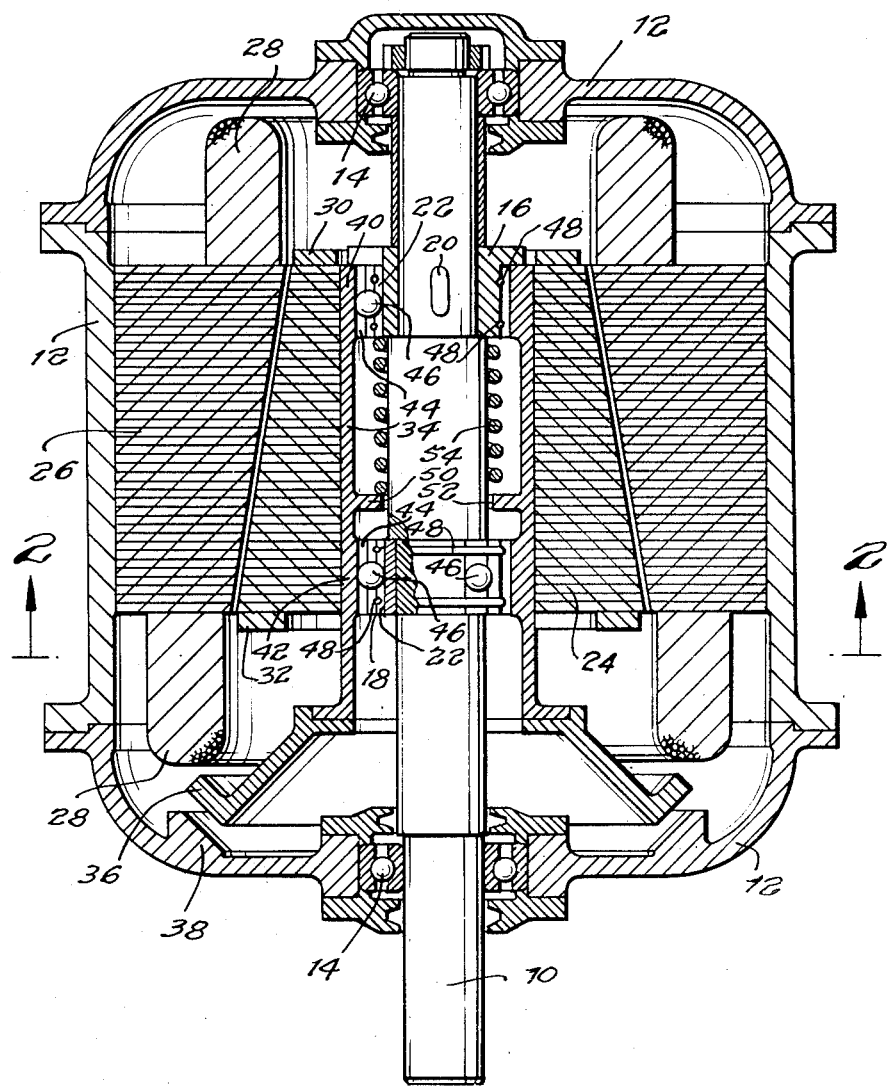
Fig. 1 is a sectional elevation of a coupling according to the invention incorporated into an electric motor.

The operation of this device is as follows:

When the motor is de-energized the rotor 24 is at rest in its lowermost end position in which the braking parts 36 and 38 are in contact with each other so that the shaft 10 cannot rotate since any rotation thereof is prevented by the balls 46 being in engagement with the grooves 22 and 44. If the brake is to be released the stator winding 28 is energized and exerts on the rotor 24 a solenoid effect displacing the rotor 24 in the direction of the axis of the shaft 10 into its other end position shown in Figure 1, thereby compressing the spring 54. At the same time the squirrel cage rotor 24 is rotated and transfers its torque to the shaft 10 by means of the collar 40, the balls 46 and the collar 16 which is connected to the shaft 10 by means of the key 20. The other collars 42 and 18 do not transfer any torque but aid the centering of the rotor 24 with respect to the shaft 10. Due to the fact that the part 18 is rotatable on the shaft 10, the grooves in the collars 42 and 18 can be readily aligned. It should be noted that the longitudinal displacement of the rotor 24 with respect to the shaft 10 may be carried out under load since the same has only to overcome the rolling frictions of the balls 46 which need very little or no lubrication.

If the motor is de-energized the rotor 24 returns to its initial end position under the force exerted by spring 54.

It will be understood that each of the elements described above, or two or more together, may also find a useful application in other types of couplings differing from the types described above.

While I have illustrated and described the invention as embodied in a coupling between the rotor of an electric motor and the shaft thereof, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What I claim as new and desire to secure by Letters Patent is:

1. A coupling comprising in combination, a hollow member adapted to rotate about an axis; a first collar-shaped portion forming part of said hollow member and being arranged substantially in a plane perpendicular to the axis of said hollow member; a second collar-shaped portion forming part of said hollow member and being arranged substantially in a plane parallel to, and being spaced from, the plane of said first collar-shaped portion, said collar-shaped portions being each provided with a plurality of grooves extending substantially parallel to the axis of said member; a shaft extending through said hollow member in coaxial relation therewith and being arranged for axial displacement with respect to said hollow member; a first collar-shaped part rigidly connected to said shaft and being arranged substantially opposite to said first collar-shaped portion of said hollow member; a second collar-shaped part rotatably arranged on said shaft substantially opposite to said second collar-shaped portion, said collar-shaped parts being each provided with a plurality of grooves arranged, respectively, opposite to said grooves of said collar-shaped portions of said hollow member so as to form a plurality of channels arranged, respectively, between said first portion and said first part and between said second portion and said second part; and balls arranged, respectively, in said channels, whereby when said hollow member is displaced axially with respect to said shaft the rotation of said hollow member is transferred to said shaft by said first portion, said first part, and said balls arranged in said channels arranged therebetween, whereas said second portion, said second part and said balls arranged in said channels therebetween center said shaft within said hollow member.

2. A coupling comprising in combination, a sleeve adapted to rotate about an axis; a first collar-shaped portion forming part of said sleeve and being arranged substantially in a plane perpendicular to the axis of said sleeve; a second collar-shaped portion forming part of said sleeve and being arranged substantially in a plane parallel to, and being spaced from, the plane of said first collar-shaped portion, said collar-shaped portions being each provided with a plurality of grooves extending substantially parallel to the axis of said sleeve; a shaft extending through said sleeve in coaxial relation therewith and being arranged for axial displacement with respect to said sleeve; a first collar-shaped part rigidly connected to said shaft and being arranged substantially opposite to said first collar-shaped portion of said sleeve; a second collar-shaped part rotatably arranged on said shaft substantially opposite to said second collar-shaped portion, said collar-shaped parts being each provided with a plurality of grooves arranged, respectively, opposite to said grooves of said collar-shaped portions of said sleeve so as to form a plurality of channels arranged, respectively, between said first portion and said first part and between said second portion and said second part; and balls arranged, respectively, in said channels, whereby when said sleeve is displaced axially with respect to said shaft the rotation of said sleeve is transferred to said shaft by said first portion, said first part, and said balls arranged in said channels arranged therebetween, whereas said second portion, said second part and said balls arranged in said channels therebetween center said shaft within said sleeve.

3. A coupling comprising in combination, a sleeve adapted to rotate about an axis; a first collar-shaped portion forming part of said sleeve and being arranged substantially in a plane perpendicular to the axis of said sleeve; a second collar-shaped portion forming part of said sleeve and being arranged substantially in a plane parallel to, and being spaced from, the plane of said first collar-shaped portion, said collar-shaped portions being each provided with a plurality of grooves extending substantially parallel to the axis of said sleeve; a shaft extending through said sleeve in coaxial relation therewith and being arranged for axial displacement with respect to said sleeve; a first collar-shaped part rigidly connected to said shaft and being arranged substantially opposite to said first collar-shaped portion of said sleeve; a second collar-shaped part rotatably arranged on said shaft substantially opposite to said second collar-shaped portion, said collar-shaped parts being each provided with a plurality of grooves arranged, respectively, opposite to said grooves of said collar-shaped portions of said sleeve so as to form a plurality of channels arranged, respectively, between said first portion and said first part and between said second portion and said second part; balls arranged, respectively, in said channels; and rings arranged, respectively, on the perimeters of said portions and parts so as to retain said balls in said channels, whereby when said sleeve is displaced axially with respect to said shaft the rotation of said sleeve is transferred to said shaft by said first portion, said first part, and said balls arranged in said channels arranged therebetween, whereas said second portion, said second part and said balls arranged in said channels therebetween center said shaft within said sleeve.

References Cited in the file of this patent

UNITED STATES PATENTS

| Number | Name | Date |
|---|---|---|
| 414,659 | Seafert | Nov. 5, 1889 |
| 422,862 | Washburn | Mar. 4, 1890 |
| 754,066 | Hoffmann | Mar. 8, 1904 |
| 846,079 | Yost | Mar. 5, 1907 |
| 1,763,104 | Shurtleff | June 10, 1930 |

FOREIGN PATENTS

| Number | Country | Date |
|---|---|---|
| 558,485 | Germany | 1932 |